(12) United States Patent
Karpenko

(10) Patent No.: US 11,281,741 B2
(45) Date of Patent: Mar. 22, 2022

(54) VIEW ORIENTED SOCIAL NETWORK (VOSN)

(71) Applicant: Oleg Karpenko, Toronto (CA)

(72) Inventor: Oleg Karpenko, Toronto (CA)

(*) Notice: Subject to any disclaimer, the term of this patent is extended or adjusted under 35 U.S.C. 154(b) by 284 days.

(21) Appl. No.: 15/731,381

(22) PCT Filed: Jun. 5, 2014

(86) PCT No.: PCT/CA2014/050520
§ 371 (c)(1),
(2) Date: Aug. 7, 2017

(87) PCT Pub. No.: WO2015/184522
PCT Pub. Date: Dec. 10, 2015

(65) Prior Publication Data
US 2018/0268075 A1    Sep. 20, 2018

(51) Int. Cl.
| | |
|---|---|
| *G06F 17/30* | (2006.01) |
| *G06F 16/957* | (2019.01) |
| *G06F 16/9535* | (2019.01) |
| *G06F 3/14* | (2006.01) |
| *G06Q 50/00* | (2012.01) |
| *H04L 51/52* | (2022.01) |
| *H04L 51/08* | (2022.01) |
| *H04L 67/01* | (2022.01) |

(52) U.S. Cl.
CPC .......... *G06F 16/9577* (2019.01); *G06F 3/14* (2013.01); *G06F 16/9535* (2019.01); *G06Q 50/01* (2013.01); *H04L 51/08* (2013.01); *H04L 51/32* (2013.01); *G09G 2370/027* (2013.01); *H04L 67/42* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 9,563,704 B1 * | 2/2017 | Greene | G06F 16/435 |
| 9,787,485 B1 * | 10/2017 | Yeskel | G06Q 50/01 |
| 2005/0177385 A1 * | 8/2005 | Hull | G06Q 50/01 705/319 |
| 2012/0030734 A1 * | 2/2012 | Wohlert | H04L 63/101 726/4 |
| 2013/0024910 A1 * | 1/2013 | Verma | H04L 63/08 726/3 |

(Continued)

*Primary Examiner* — Hung D Le

(57) ABSTRACT

The invention introduces a technique to enable users in a social networking system to enhance their representation and optimize their operation based on their data. The social networking system as proposed herein consists of informational views as logical units to simulate encapsulation of their user data to optimize such views' operation, thus utilization of such data, where i) such view relationships express either explicit user intentions or implicit state of key user data specified as such view connection preferences, and ii) such view permissions enable privacy controls for each such view, and iii) such view functions and services offer such view interactive capabilities while such view attachments capture such view generated data for automated data analyses with consequential such view data, function or service adjustments.

7 Claims, 21 Drawing Sheets

(56) References Cited

U.S. PATENT DOCUMENTS

Figure 2:
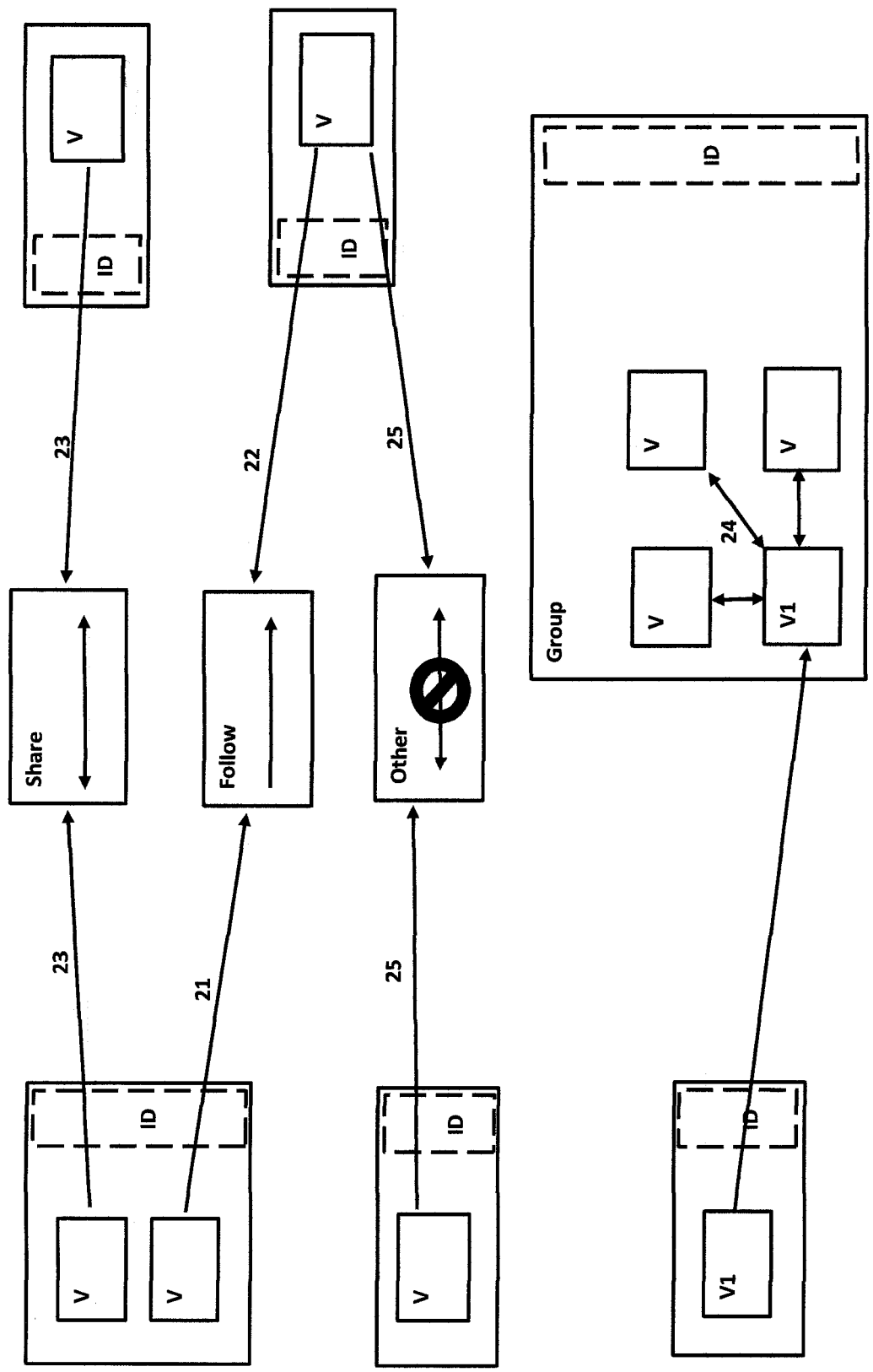

2014/0092127 A1\* 4/2014 Kruglick ................. G06F 21/84
 345/629
2014/0129627 A1\* 5/2014 Baldwin ............... H04L 67/306
 709/204

\* cited by examiner

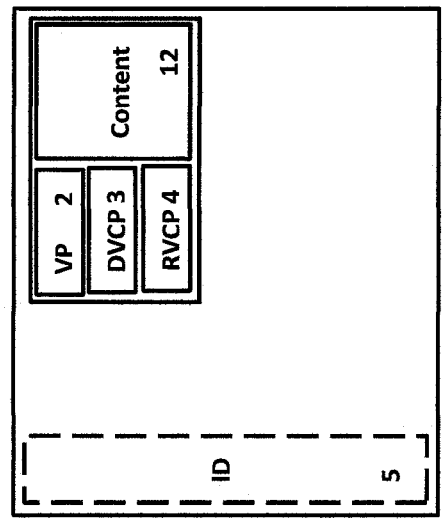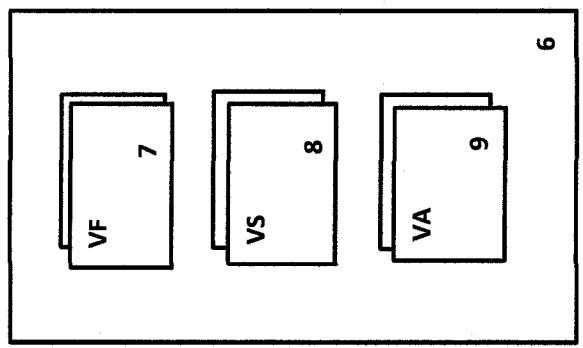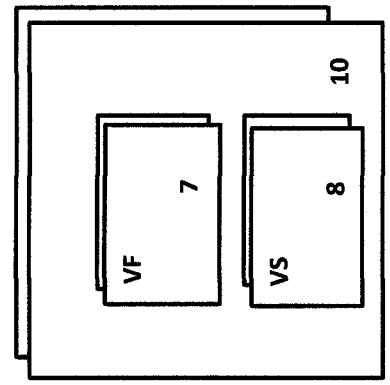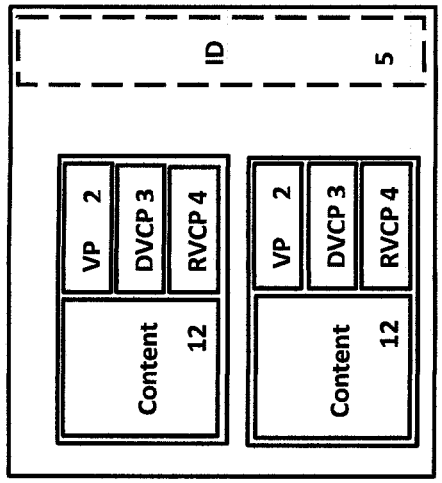
Fig. 1

VIEW ORIENTED SOCIAL NETWORK (VOSN)

BACKGROUND OF THE INVENTION

Social networks have proliferated on the internet due to contemporary demands for online social interactions many of which are met by various solutions offering different contexts or schemes to attract their audiences. Content provision by a typical social networking system is carried out according to i) the information explicitly requested by such network to properly maintain user accounts and ii) user browsing information implicitly aggregated by such network to be able to offer various contemporary social features to their users.

Although evolving, the status quo web content provision is deemed rather insufficient by an increasing number of web users due to user i) ignorance as to what user data is implicitly collected as a result of their browsing experience, ii) limited understanding of how their data is actually used, and iii) very limited, if any, capacity to influence user experience through their data. The perpetual competition of web content/service providers to offer innovative experience further stretches the boundaries of user privacy which may inadvertently be exposed or, sometimes, misappropriated by illegal actions.

Wearable devices have introduced new demands for data integration and device interoperability on a large scale where such co-operative efforts could offer far-enhanced technical capabilities and data analysis to provide for improved social benefits.

BRIEF SUMMARY OF THE INVENTION

Considered broadly, a social networking system according to this invention comprises user informational views ("views") as collections of systematically maintained user data to simulate data encapsulation and optimize user interactions. All views in such social networking system connect according to their relationships with each other which can be of shared (or intelligent), following, follower, group or other relationship type. Each view relationship is established as the result of i) an explicit action taken by one view in relation to the other view to create a following, follower or group relationship; or ii) mutual compatibility of view connection preferences to implicitly detect a shared, or intelligent, relationship between two views; or iii) non-existence of the above described relationships which is identified as other view relationship. A view network extends an existing view relationship of its creator view with such view network member views. Set according to such view relationships, view permissions control access to each view and its content which is aggregated according to view functions or view services that offer various interactive capabilities. The view services enable custom operations among their views whereby one such view acts as a view service client while another such view acts as a view service server. The communication between the view service client and view service server is conducted by view service requests and responses. Any data generated by a view service are aggregated as a view attachment where such view attachments facilitate data exchange and analysis, and alternatively can be created outside of a view service.

Figure 3:
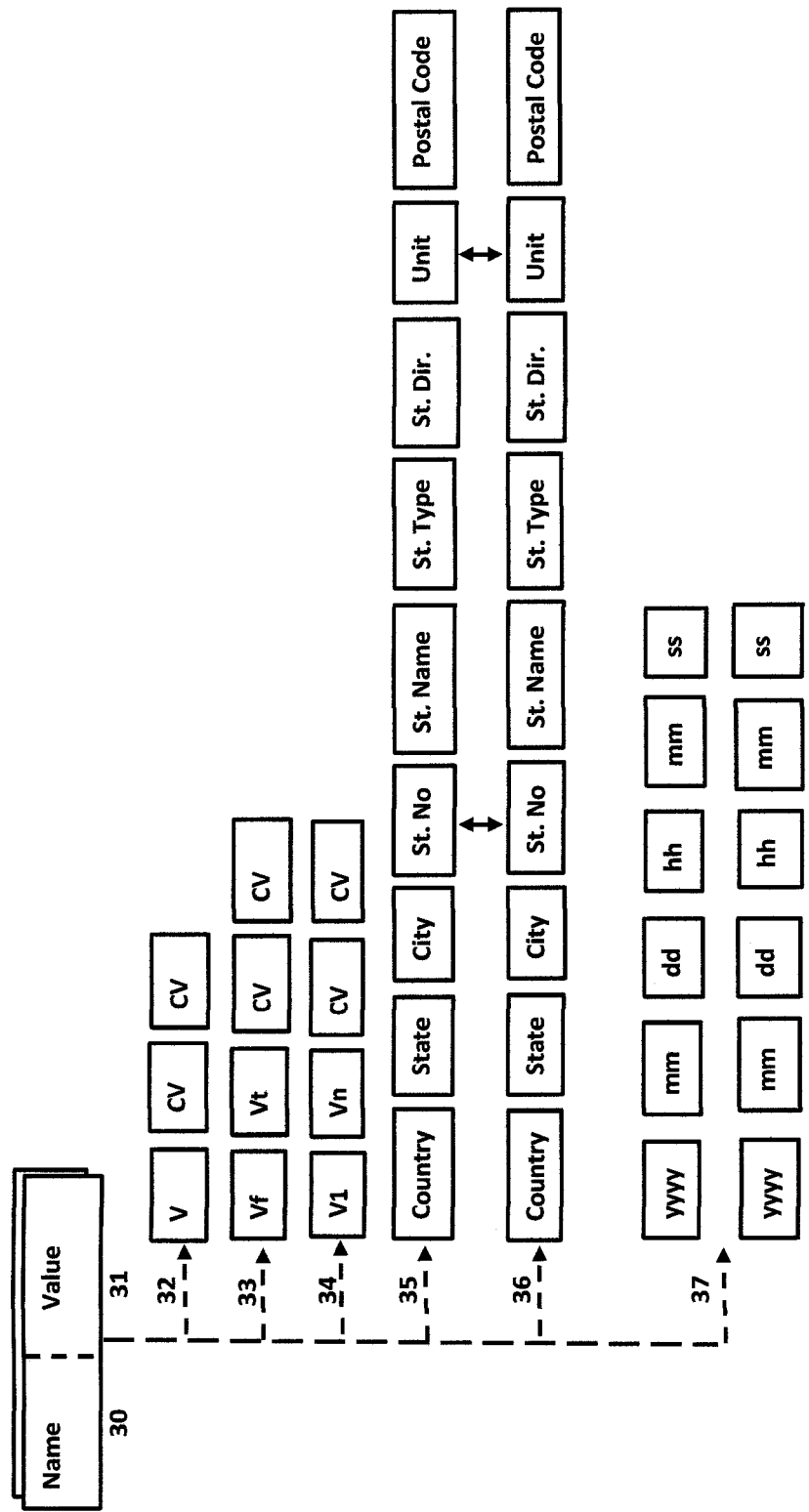
Figure 4:
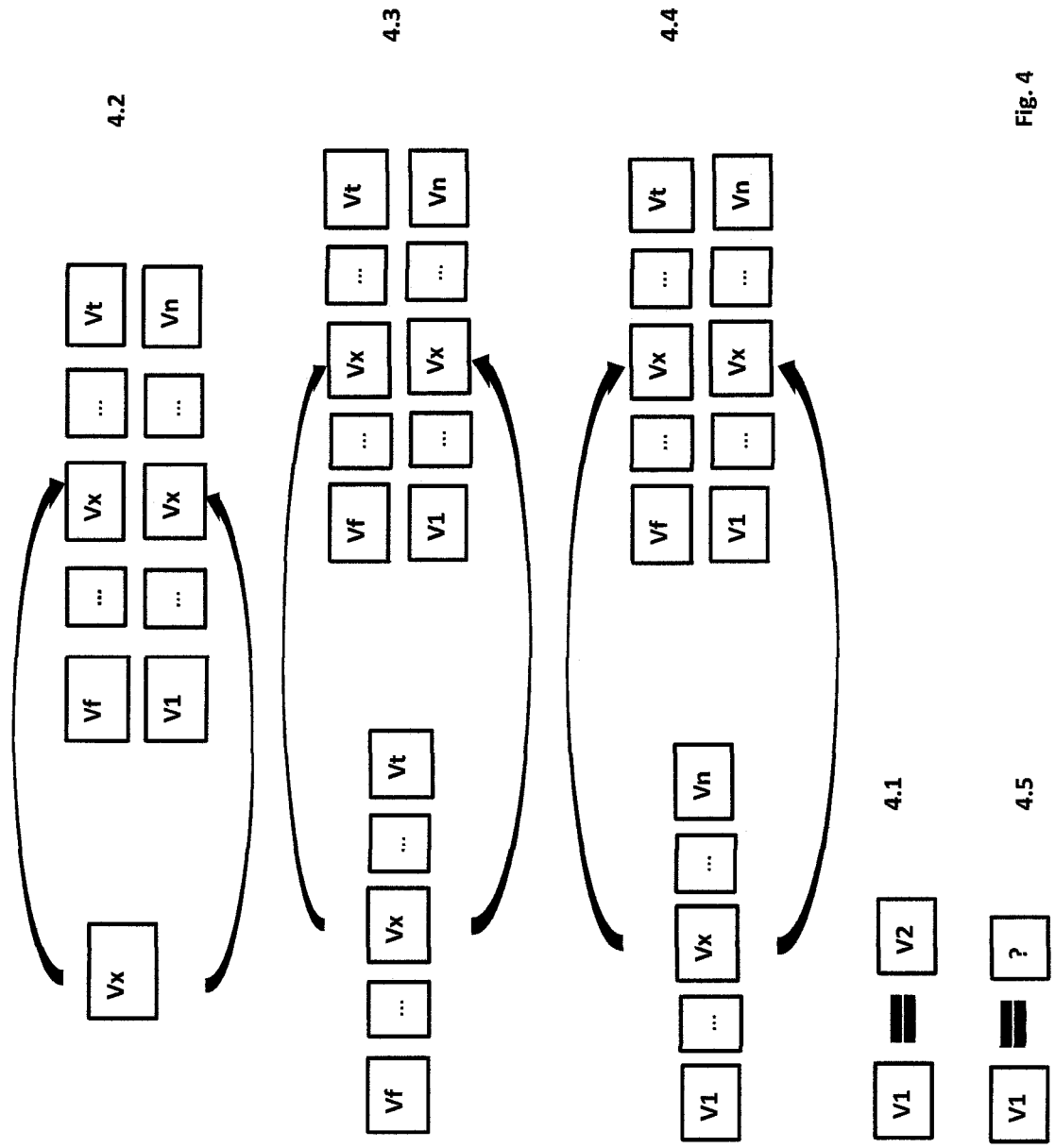
Figure 5:
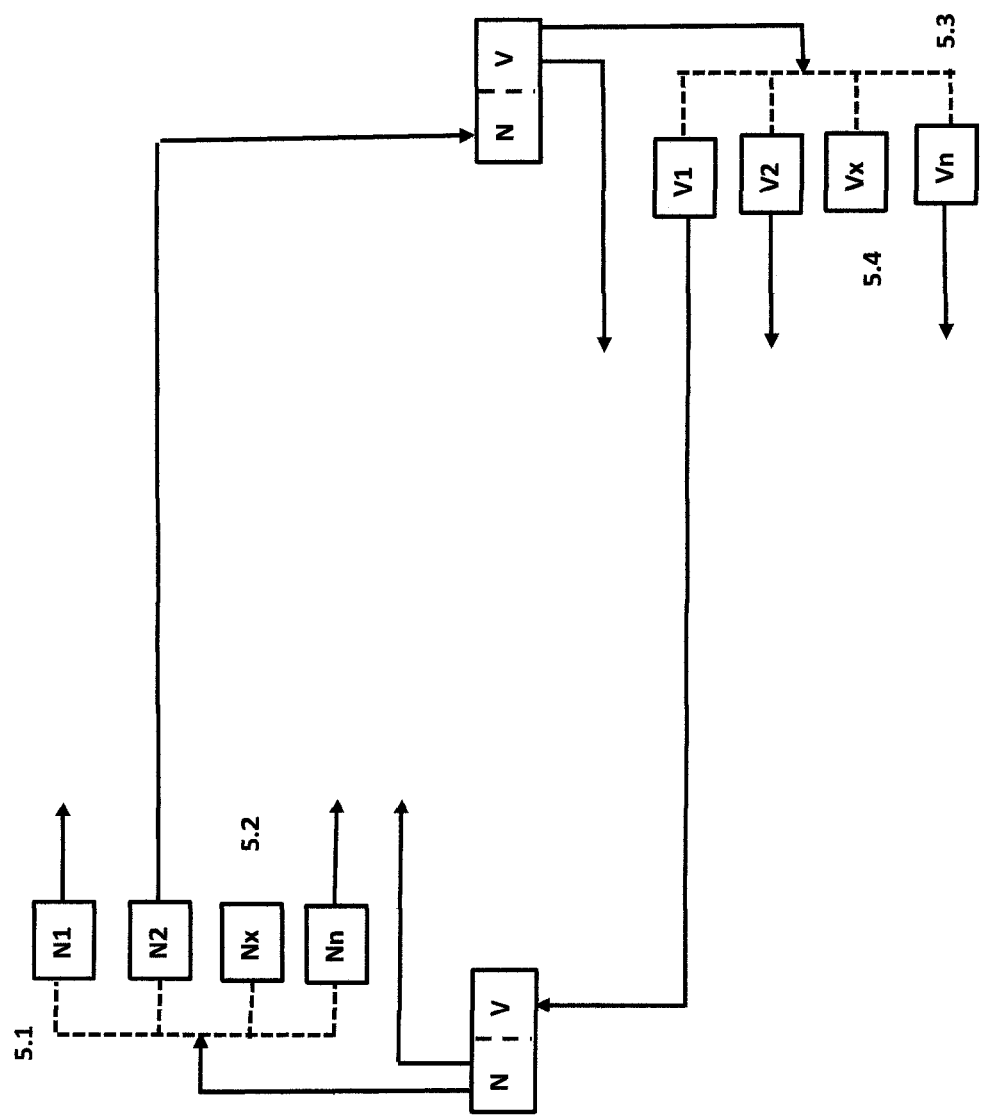
Figure 6:
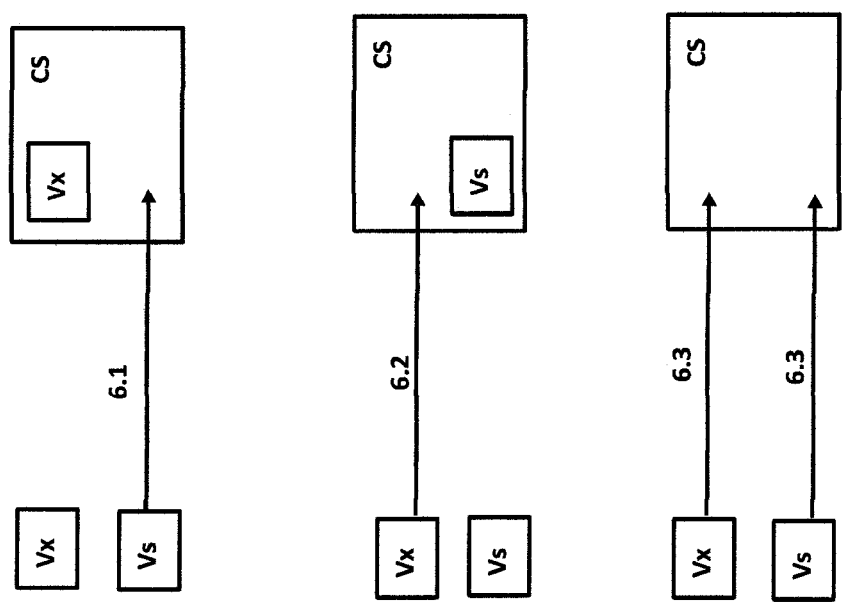
Figure 7:
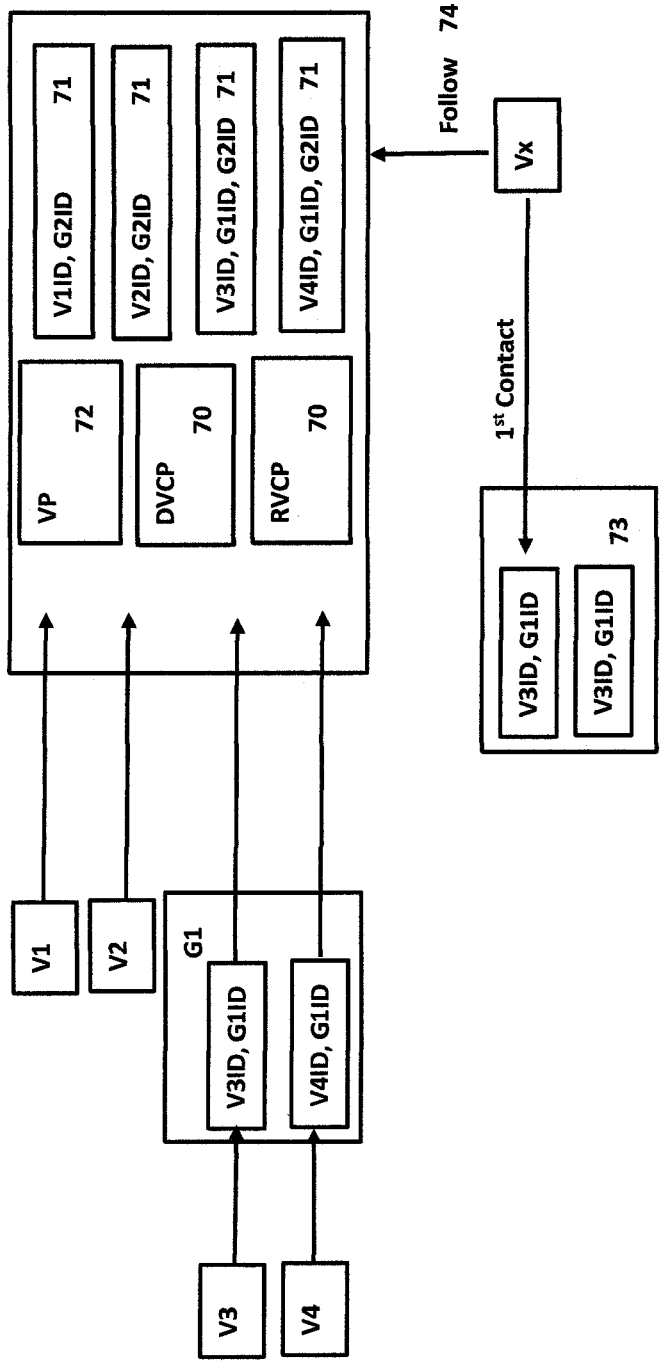
Figure 8:
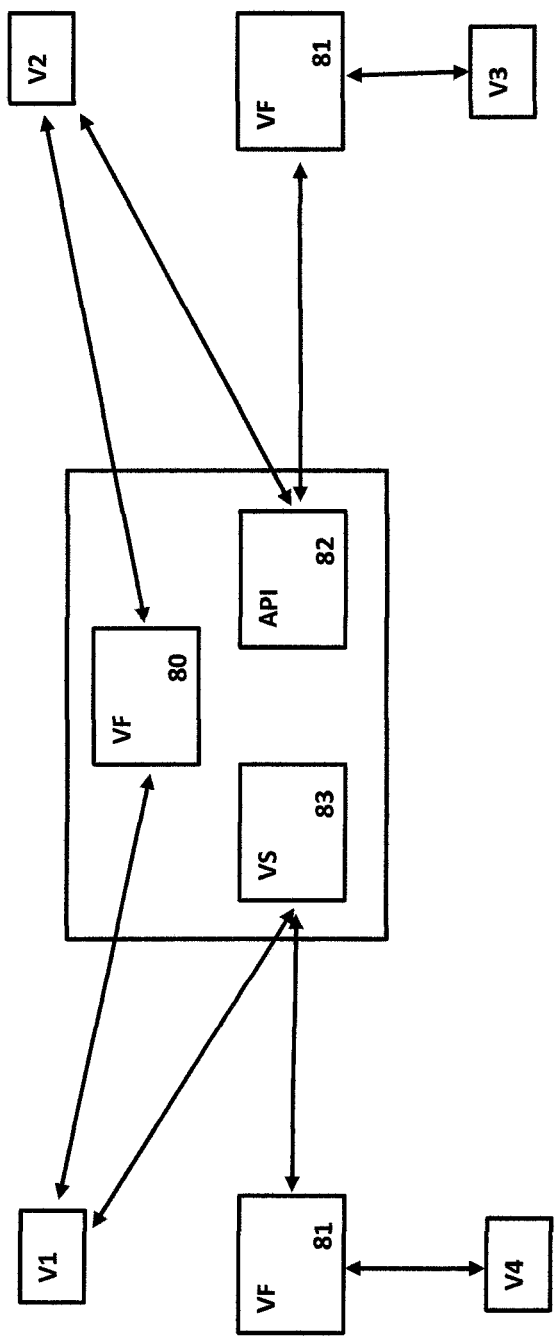
Figure 9:
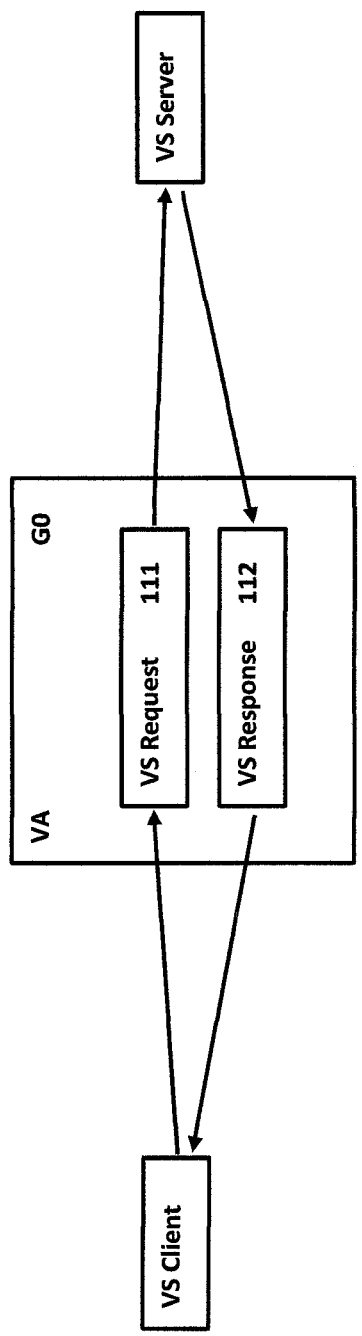
Figure 10:
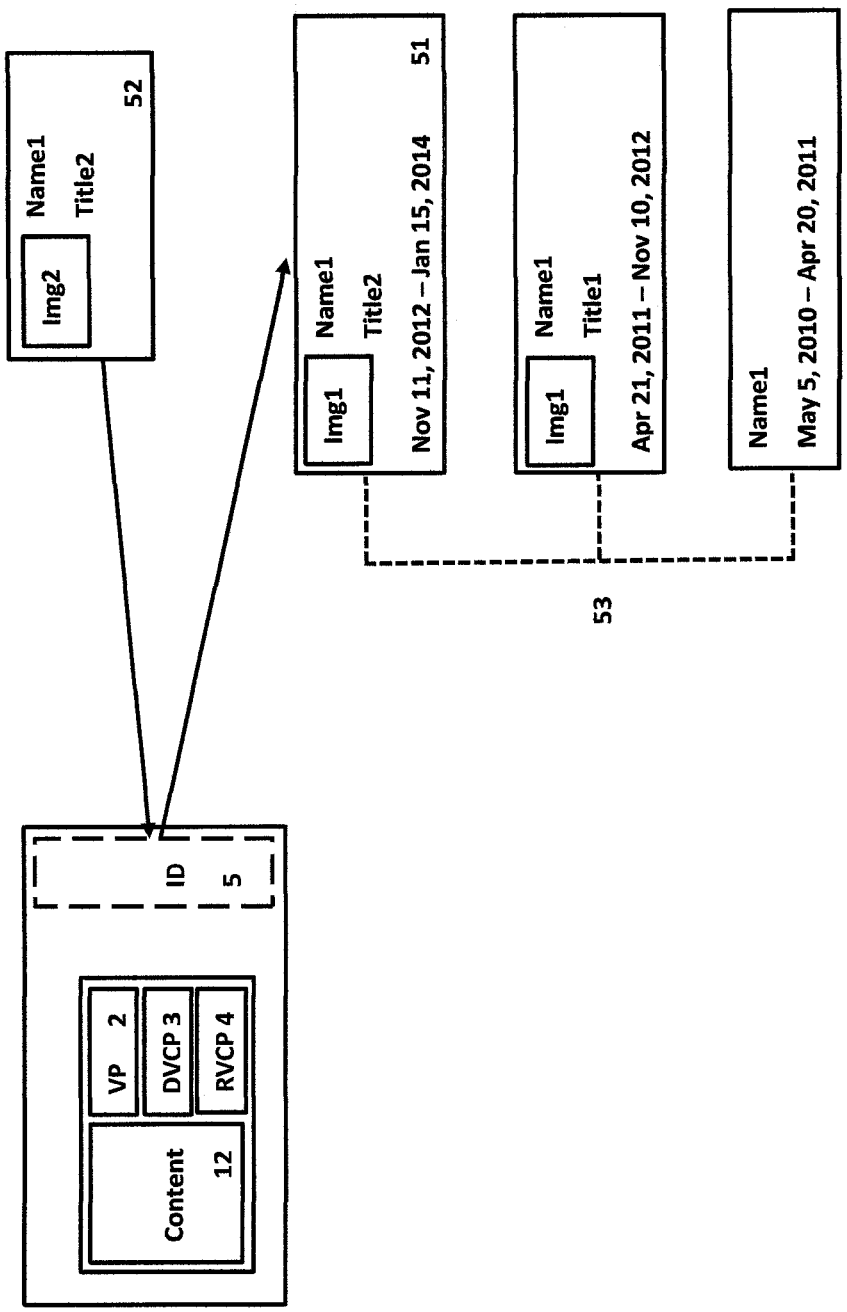
Figure 11:
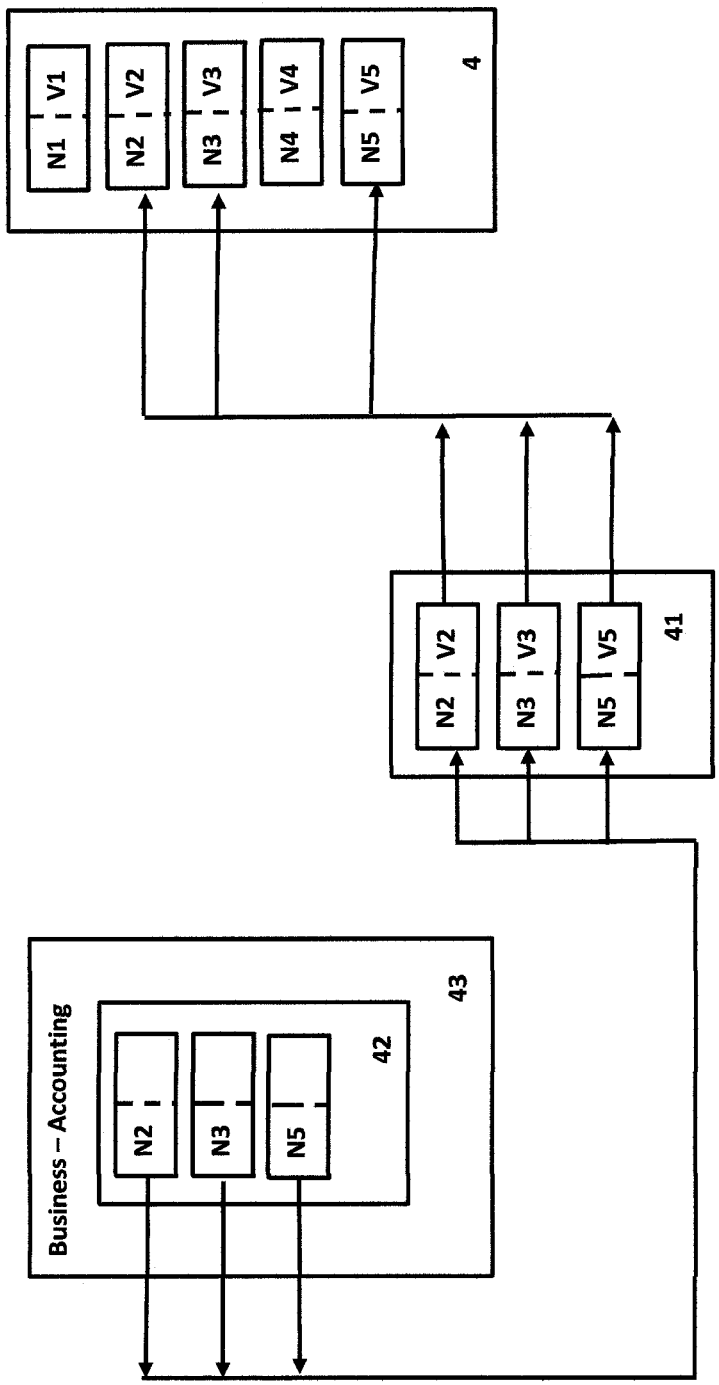
Figure 12:
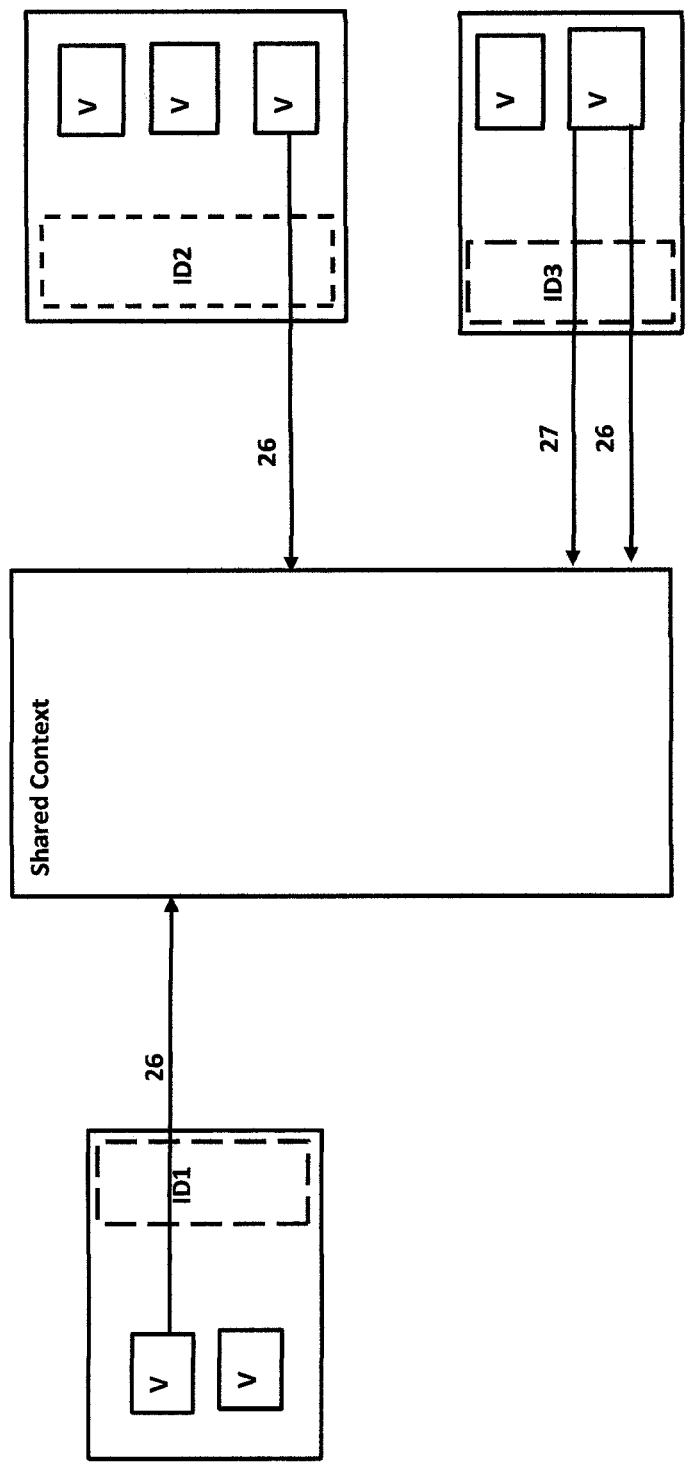
Figure 13:
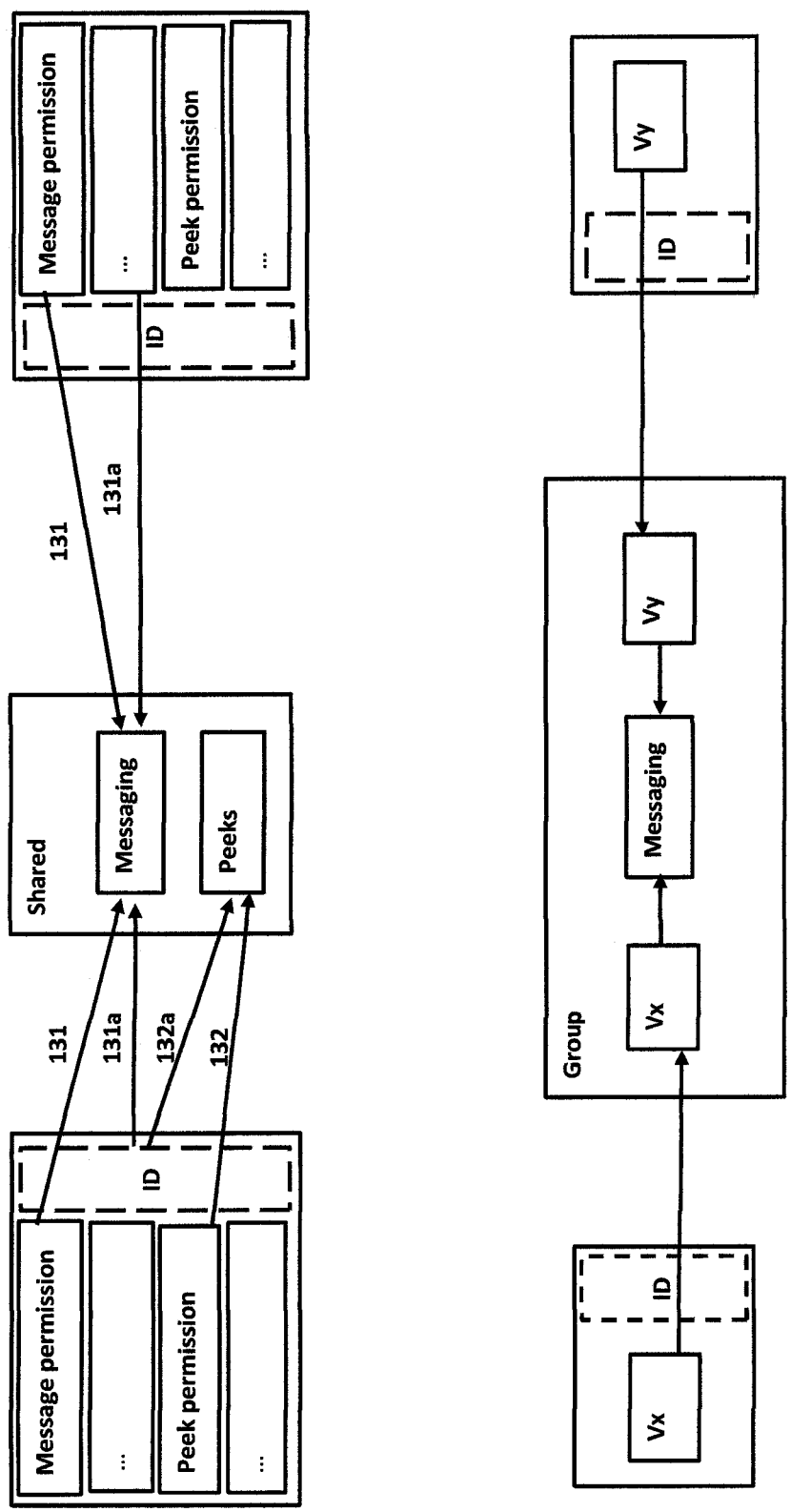
Figure 14:
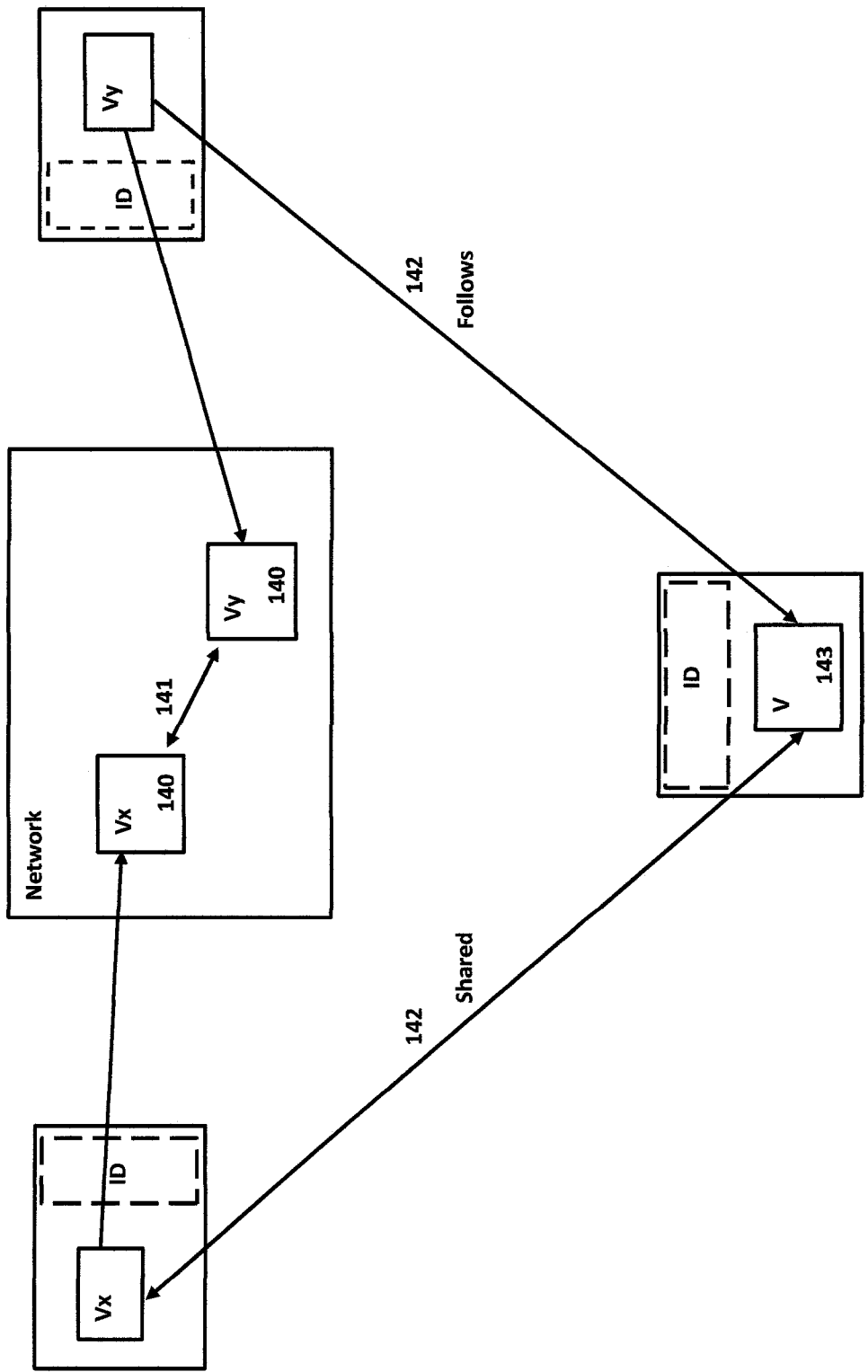
Figure 15:
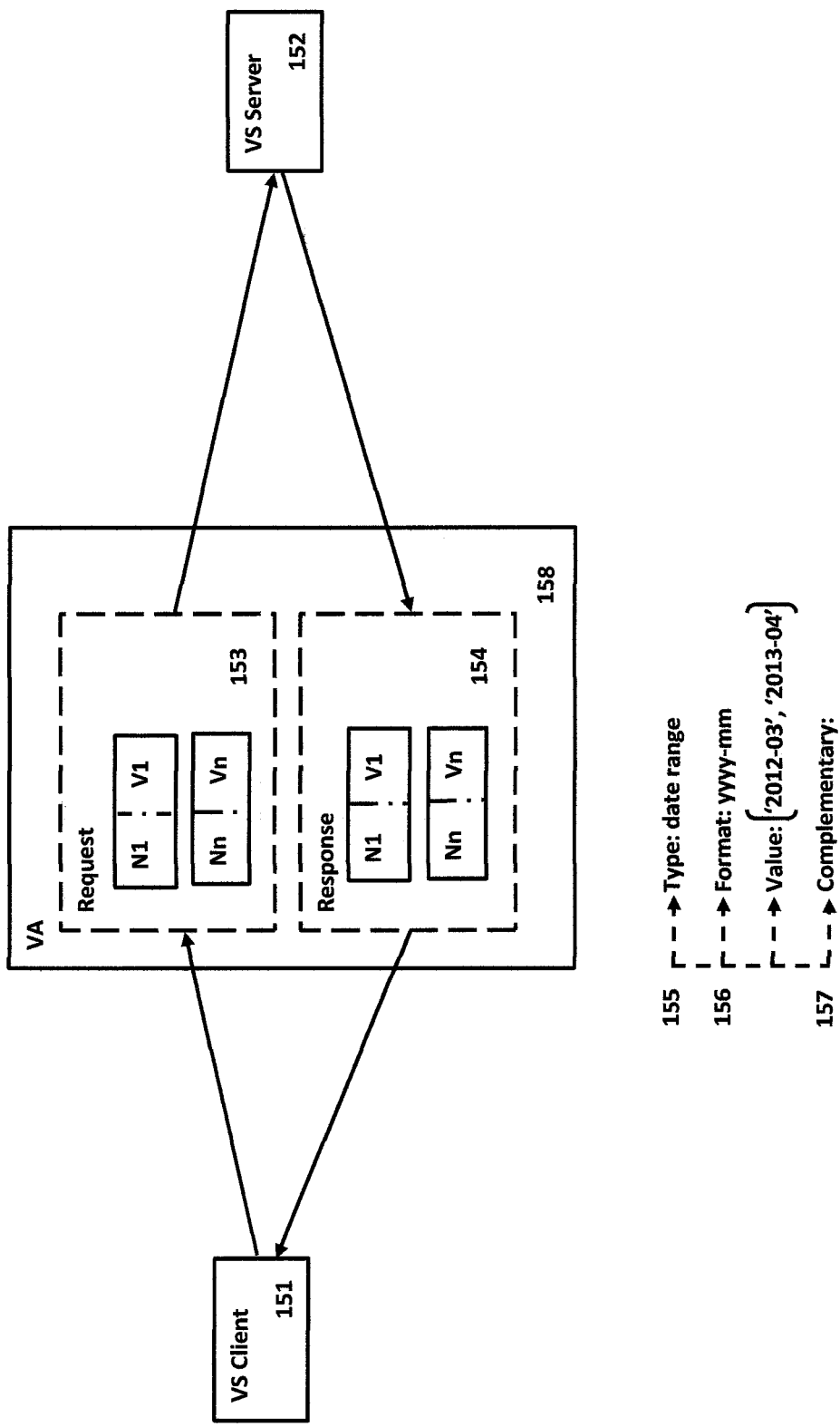
Figure 16:
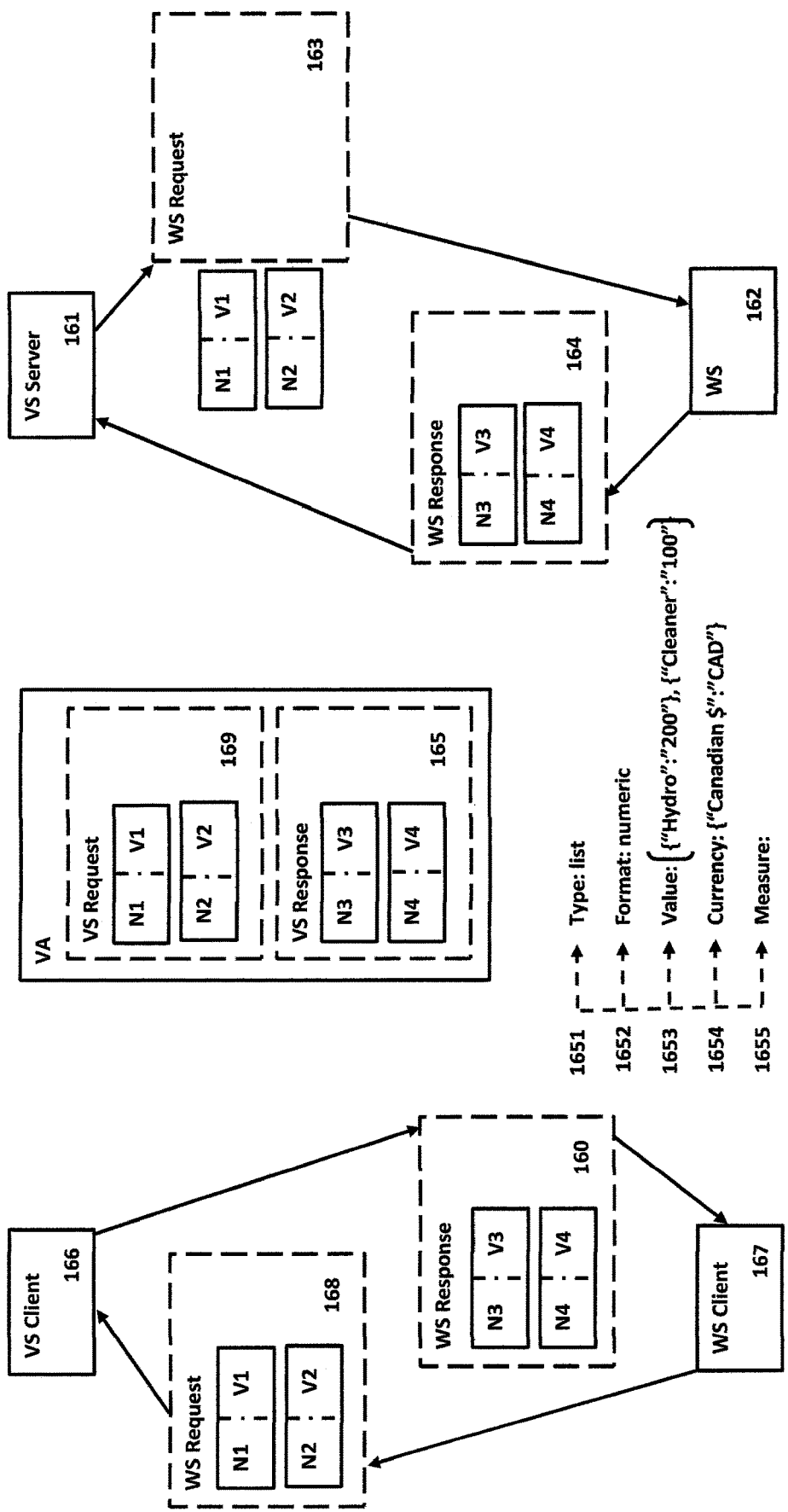
Figure 17:
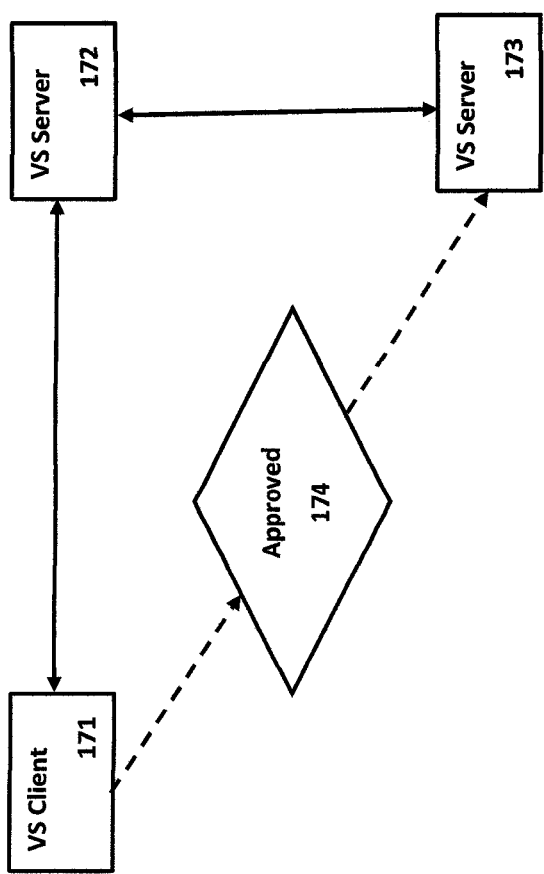
Figure 18:
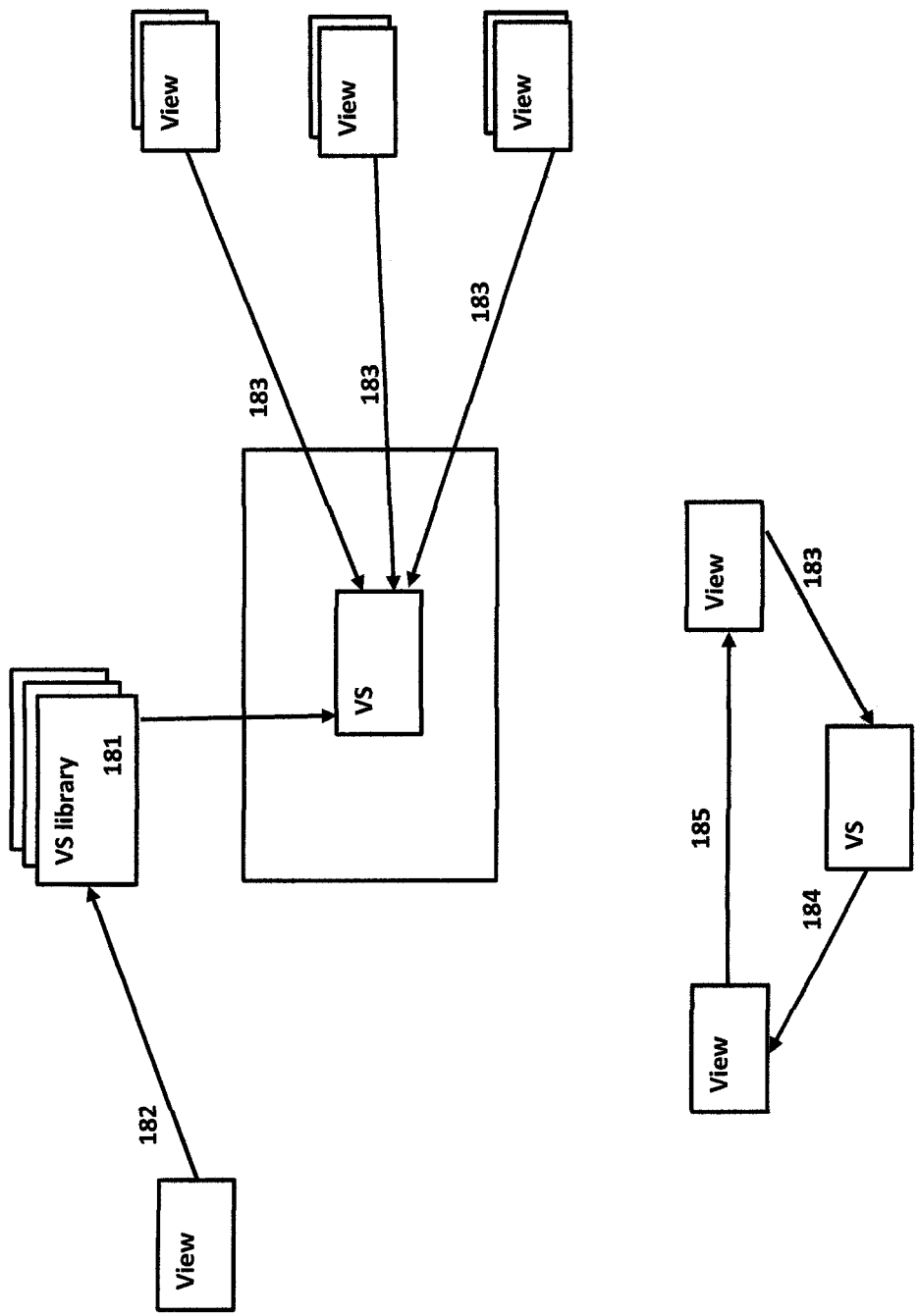
Figure 19:
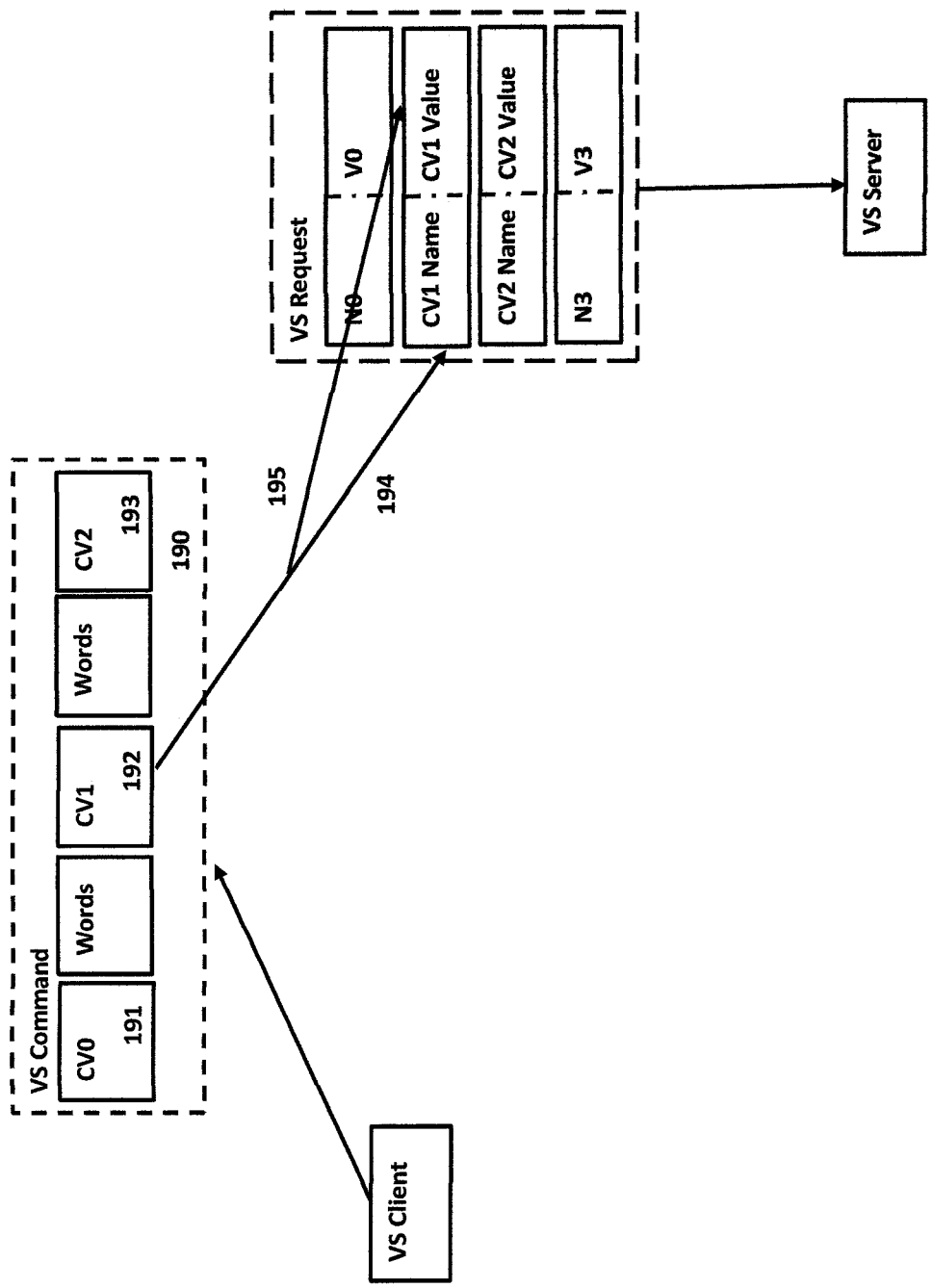
Figure 20:
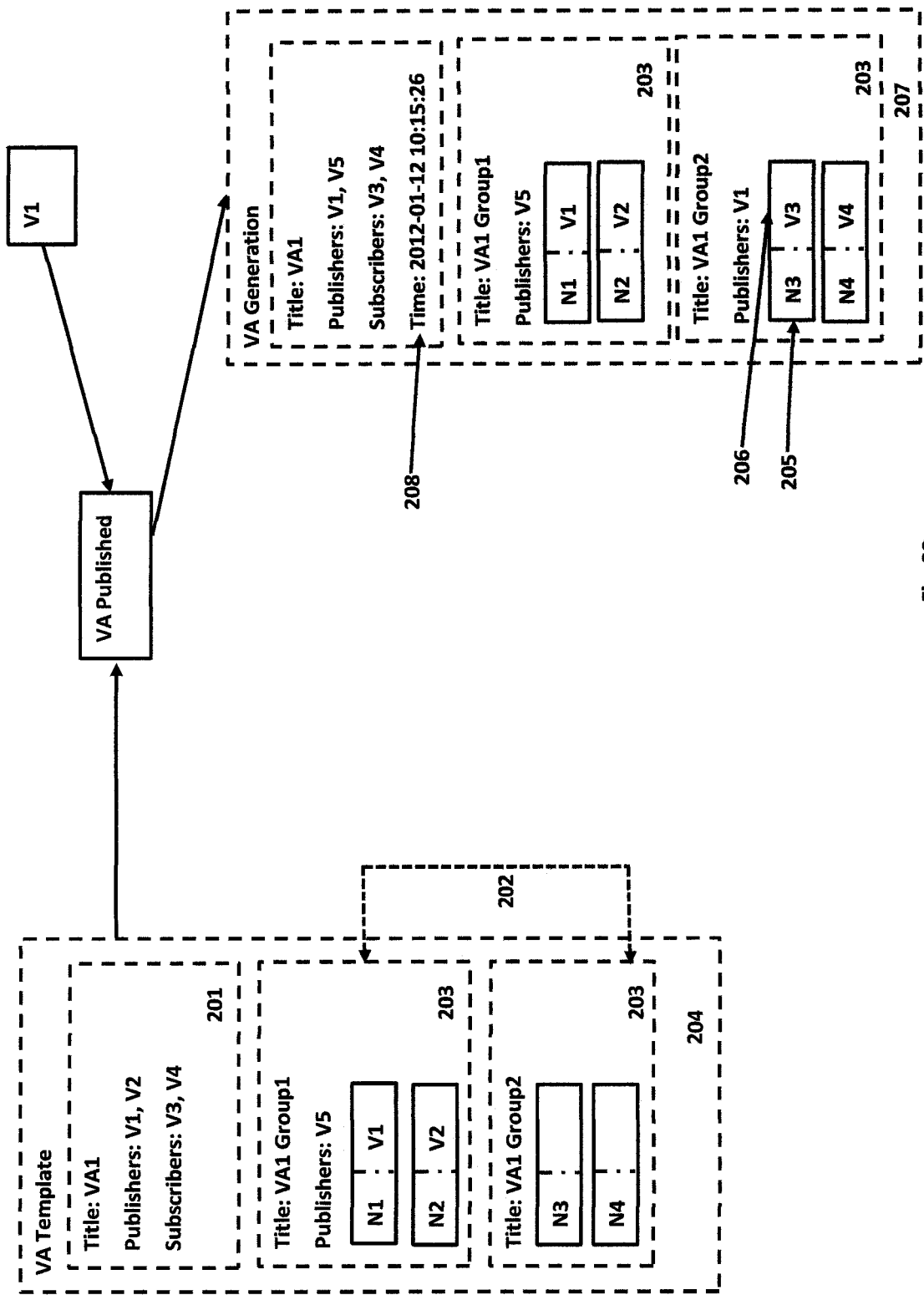
Figure 21:
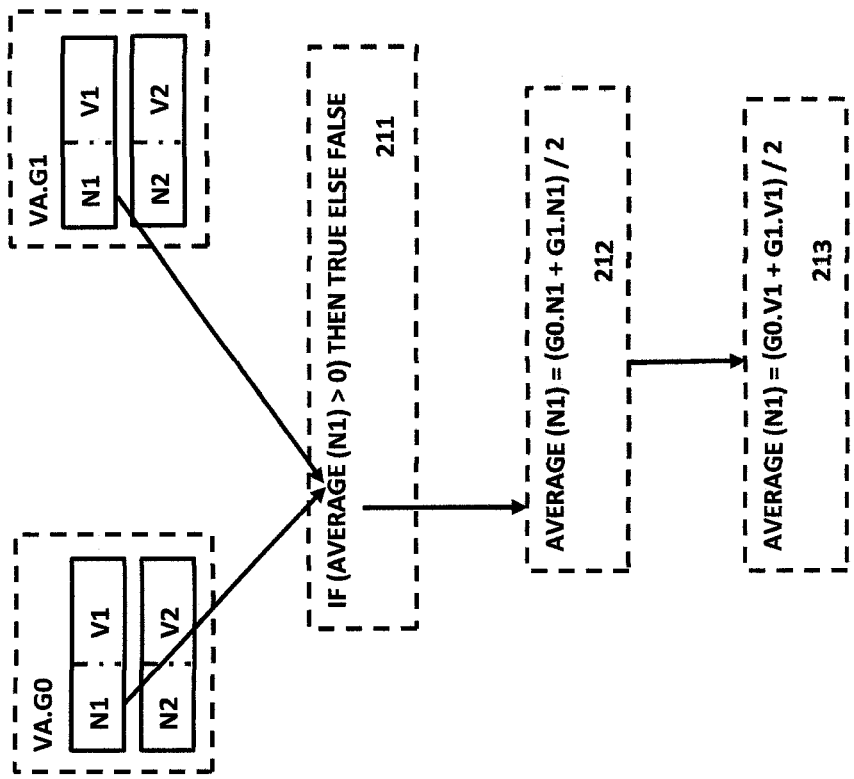

In the drawings, which form part of these specifications,
FIG. 1 is the network components overview;
FIG. 2 illustrates view relationships;
FIG. 3 illustrates view connection preferences;
FIG. 4 shows how compatibility in view connection preferences is determined;
FIG. 5 illustrates how crowd source data is applied;
FIG. 6 shows how crowd source data is stored;
FIG. 7 shows how a group view is structured;
FIG. 8 shows how view function operate;
FIG. 9 shows how a view attachment generation is created by a view service;
FIG. 10 shows how a view identity history is maintained;
FIG. 11 demonstrates how view connection preferences are inserted with a view profile;
FIG. 12 illustrates a view relationship context;
FIG. 13 demonstrates how view permissions apply;
FIG. 14 demonstrates a view network and its relationships;
FIG. 15 illustrates view services;
FIG. 16 shows how view services communicate with web services;
FIG. 17 shows a view service server as a view service client;
FIG. 18 illustrates a public and private view service;
FIG. 19 demonstrates a view service request command;
FIG. 20 illustrates a view attachment, its template and generations;
FIG. 21 illustrates analytic rules for view attachments.

DETAILED DESCRIPTION

In a particularly advantageous embodiment of the invention as illustrated, a social networking system as seen in FIG. 1 comprises user informational views 1, either personal or group, each consisting of a view identity 5, view permissions 2, descriptive view connection preferences 3, requisite view connection preferences 4, and view content 12. The view identity 5 consists of a name and may include an image and/or title. As seen in the FIG. 1, a plurality of such views can be represented by a same view identity 5 which must be attached to each such view 1 in order to represent it. When such view as seen in FIG. 10 changes its view identity from 51 to 52, the previous view identity 51 is appended to the view identity history 53 which comprises all one view identities. The view identity 5 can be deleted when it is not attached to any view.

Collectively, view connection preferences as seen in FIG. 1 consist of descriptive view connection preferences 3 and requisite view connection preferences 4 where descriptive view connection preferences hold information that describe its view to connecting views while requisite view connection preferences contain the information that is required in connecting views to satisfy a matching algorithm that each shared, or intelligent, view relationship is based on. The composition of both descriptive view connection preferences and requisite view connection preferences is the same each to include a name 30 and value 31 as seen in FIG. 3 where such names are mandatory in both the descriptive and requisite view connection preferences while values are optional in the requisite view connection preferences. Each view connection preference values are formatted as date/time, location or text and are specified as single, range or list of values. The date/time and location are composite formats that indicate which elements are to be included and how such elements are to be positioned within a value. The date/time format 37 comprises a combination of 1) year, 2) month, 3) day, 4) hour, 5) minute, 6) second, all being represented for data storage/transmission by valid numerical values and specified according to a selected calendar type with the default of Gregorian. The date/time format may include a time zone specified as an offset to the UTC time and expressed as a signed decimal value. A range of date/time values can be specified by formatting each range boundary as a date/time, date or time. The location format 35 comprises a combination of 1) country, 2) state or province, 3) city or county or district, 4) town or village, 5) street number, 6) street name, 7) street type, 8) street direction, 9) unit, 10) postal code or equivalent. A range of locations 36 can be specified whereby either a street number or unit can be used to define the range boundaries. The text format can be complemented with data that requires no special formatting and is universally acceptable such as currency or unit of measure.

Both view connection preference names and values, or broadly defined to include any information with a label to be interpreted as a data item name while such information to be interpreted as a data item value, can be supplemented by crowd source information which stores information according to its relevance to the information that it is set to supplement. When new information is added to such crowd source (FIG. 6), it is added to the same crowd source i) as the information that the newly added information is set to supplement (6.1) or, alternatively, ii) where the newly added information exists while the supplemented information does not exist (6.2). If no crowd source can thus be found, then a new crowd source is created and both the newly added and supplemented information are added to such crowd source (6.3). When a crowd source as described is invoked to supplement a view connection preference name as seen in FIG. 5, all names that belong to the same crowd source as the supplemented name (5.1) except for the names that have been excluded are used as permitted variants to expand the matching capacity of the supplemented name (FIG. 19) by offering more alternative names for any evaluation or process where such information is sought. Any information provided by such crowd source can be customized to exclude information for each supplemented element (5.2 or 5.4). The crowd source information for view connection preference values is used, as described above for view connection preference names (5.3), as permitted variants to expand the matching capacity of a supplemented value by offering more alternative values for any evaluation or process where such information is sought.

View profiles represent data stereotypes detected in the view connection preferences. As seen in FIG. 11, each view profile 41 is defined in its template 42 which includes only the names of the view connection preferences that comprise a view profile. View profile templates as described are categorized according to their context 43. New connection preferences can be added to a view by providing values for the names in a view profile template. View profile information can be deleted from view connection preferences by deleting a view profile from the list of view profiles detected in such view connection preferences.

All views as proposed by this invention are connected by their view relationships which are established when at least one of the following conditions are met as seen in FIG. 2 where i) one view follows another view thus establishing a following view relationship 21 for the first view and a follower view relationship 22 for the second view; or ii) the view connection preferences of one view are mutually compatible with the view connection preferences of another view which creates an shared, or intelligent, view relationship 23 for both views; or iii) one view joins a group view creating a group view relationship 24 with each member of such group view; or iv) none of the above conditions exist which is identified as an other view relationship 25. The shared, or intelligent, view relationship is deemed to exist between two such views when all values in the requisite view connection preferences of view one are compatible with values for the same names in the descriptive view connection preferences of view two and vice versa. Two values are deemed compatible when such values are formatted using one same compound data format including any complementary data and, as seen in FIG. 4, i) single values are identical (4.1), or ii) single values fall within all applicable boundaries of a range of values, or iii) single values comprise a list of values (4.2), or iv) a range of values at least partially comprises a list of values (4.3, 4.4), or v) two ranges of values overlap (4.3), or vi) two lists of values overlap (4.4), or vii) no value is provided (4.5) in a requisite view connection preference. Data conversion may be performed by casting data as deemed necessary for proper evaluation.

All individual view relationships of one relationship type comprise a view relationship context 27 for each view as seen in FIG. 12. When a plurality of views within the view shared or other relationship context have one same view identity and no contact has been made with such views, then any view attached to such view identity can represent it; when a contact has been made, then only the contacted ("sticky") view 26 as seen in FIG. 12 can continue to represent such view identity with the view that made the contact. Alternatively, a default view can be created for each view identity to hold an aggregate state of the view connection preferences of all views attached to such view identity and all new contacts can be presumed to have been made with such default view. Any view relationship can be personalized by being marked as favourite 27.

Any view that joins a group view as seen in FIG. 7 is represented in such group view by a group member view to be created at the time of joining. Each group member view may assume its group view settings including its group view connection preferences 70 and permissions 72 at the time of joining it. The view identity of a group member view is comprised of its original view identity appended by the joined group view identity whereby the original view identity is the view identity that entered into its first group view relationship. Any view can be invited to join a group view which is managed by such inviting group view administrator (s). Alternatively, any view can join a group view according to its view relationship with such group view and if such joined group view permissions allow the joining view relationship to join such group view. A group view member is connected to another group view member of a same group view by a group view relationship 24 as seen in FIG. 2. All one group view members are represented outside of their group view by their composite group member view identity while their connections and relationships with any view outside of the group view are governed by their group member view connection preferences and permissions. Alternatively, a group view, as seen in FIG. 7, can have a public index 73 to list only those its group member views by their view identity that can be accessed outside of such group view by any view according to their view relationship 74 with such group view but regardless of their relationship with such indexed group member views.

View permissions define access privileges among views in a social networking system as invented herein and are set according to view relationships for individual view functions or services, or combinations thereof, which may require two-way, one-way or no permissions. Each view permission is set by including permitted view relationships. The two-way view permission 131 as seen in FIG. 13 requires that each side to a view relationship satisfies the same permission requirement of the opposite side to connect over a specific view function or service, or a combination thereof. The one-way view permission 132 requires that only one side to a view relationship meet the permission requirement of the opposite side to connect over a specific view function or service, or a combination thereof. When no permission 133 is required for a view function or service, or a combination thereof, then all views connect over such view function or service, or a combination thereof, regardless of their view relationships. The view identity permission is a basic, two-way permission that supersedes any other view permission which is enforced for each view during its access validation where the view identity permission (131*a*, 132*a*) is validated before any other view permissions can be validated to determine access among views.

View networks extend view relationships as seen in FIG. 14 and enable view network member views 140 to connect to one another 141 regardless of their view relationship with each other as long as their view relationship 142 with the view network creator 143 is valid and mutually permitted. Views join a view network according to such view network privacy permission which sets those view relationships between a joining view and the view network creator that are permitted to join such view network.

View functions enable views in a social networking system as invented herein to interact. As seen in FIG. 8, view functions can be provided by the social networking system 80 or third-parties 81. Third-party view functions communicate with the social networking system by either APIs 82 or view services 83 to exchange information with the social networking system. In order to be used, each view function is selected from a public repository of functions, where all available functions are managed and categorized, and attached to any view that wants to uses it.

View services enable views in a social networking system as invented herein to serve each other whereby as seen in FIG. 15 one view acts as a service client 151 and the other view acts as a service server 152. The communication between such view service client and server is conducted on a request/response basis whereby such view service client creates a view service request 153 to provide the information required by such view service server to perform its operations and generate a view service response 154 with a result code. The information in either view service request or view service response consists of data items each comprising a name and value. The data item name is set as text while the data item value is set as seen in FIG. 15 according to its type 155, format 156 and complementary information 157. Valid value types include single, range, list, date/time, date/time range, date/time list, location, location range, list of locations, URL, list of URLs, file, list of files such as image, list of images, video, list of videos, document, list of documents. The value format indicates format requirements to apply to the data item value whether for data storage or transmission. The value format for a single, list or range value types is set as alpha, numeric or alphanumeric. The value format for the date/time value type indicates a required combination and positioning for a year, month, day, hour, minute, second. The value format for the location value type indicates a required combination and positioning for 1) country, 2) state or province, 3) city or county or district, 4) town or village, 5) street number, 6) street name, 7) street type, 8) street direction, 9) unit, 10) postal code or equivalent. The URL value type comprises a URI and text. The value format for the file value type such as an image, video or document is specified as an applicable valid MIME type. Any universally acceptable data that requires no formatting complements the data item value and is specified as its complementary information. Each complementary information item 157 such as currency or unit of measure is represented by a unique code.

Each view service as described above can be i) performed manually whereby such view service data item values are set manually, or ii) automated by either a view service client or view service server whereby such view service client exchanges information with a web service client and such view service server exchanges information with a web service. When a view service server 161 as seen in FIG. 16 communicates with a web service 162, it acts as a web service client to send any information contained in a view service request as a web service request 163 and to format any information received in a response 164 from such web service as a view service response 165. When a view service client 166 communicates with a web service client 167, it acts as a web service to receive a web service request 168 from such web service client, to format such information as a view service request 169 and to generate a web service response 160 from any view service response. In the preferred embodiment, any web service as described above is a RESTful web service and any information exchanged between a view service and such web service is formatted as JSON messages whereby view service data item names correspond to web service message parameter names and view service data item values correspond to web service message parameter values. Each web service message parameter value comprises a type 1651, format 1652, value 1653 and complementary elements such as currency 1654 or unit of measure 1655 etc. The type 1651 and format 1652 of a web service message parameter value must match the type and format of the corresponding view service data item value. Any complementary elements of a web service message parameter value must match the complementary elements of the corresponding view service data item value with each such complementary element comprising a code and description.

The server of one view service 172 may also be the client of another view service 173 as seen in FIG. 17 in which case the original client 171 has the authority 174 to approve or disapprove any such third-party service requests as defined in the original view service description. The scope of the information exchanged in the original view service, which is limited to the original client and server, may be extended to a third-party view service if authorized by the original client.

Each view service as described above can be private or public where a public view service is selected from a public repository of view services 181 as seen in FIG. 18 where such view service creators or servers publish their view services. Each public view service is activated and thus made available for public subscriptions 183 when it is published 182 by its view service server. A private view service is activated 184 and thus made available by invitations 185 distributed by its view service server. Both a private and public view service must be subscribed to receive. Deactivation of a view service stops its distribution and provision.

Each view service request as described above can be invoked manually, scheduled to occur at a set time or interval, or triggered by a command and enhanced by a voice-recognition software. A view service request command 190 as seen in FIG. 19 may include dynamically supplied variable data which are consequently included in the corresponding view service request to trigger such view service. Each view service request command comprises a number of words whereby dynamic variable values are defined as anything that take place between i) two constant words 192, ii) the command beginning and the first constant word 191, or iii) the last constant word and the command end 193. Thus defined view service request command variables are mapped to the corresponding view service request data items whereby the command variable names are mapped to such view service request data item names 194 and command variable values are mapped to such view service request data item values 195.

View attachments facilitate the aggregation and analysis of data generated by views in a social networking system as invented herein. Each view attachment is accessed by its publishers and subscribers through permitted view relationships with such view attachment creator. Each view attachment publisher is represented by its view identity and is allowed to publish view attachment data according to an assigned access scope which can be a view attachment group or view attachment. When such view attachment publisher is specified as a group view, then all such group view member views can publish to such view attachment according to an assigned access scope. Each view attachment subscriber is represented by its view identity and is allowed to read view attachment data according to an assigned access scope which can be a view attachment group or view attachment. When such view attachment subscriber is specified as a group view, then all such group view member views can read such view attachment according to an assigned access scope. Each view attachment comprises a header 201 and data 202 as seen in FIG. 20 where such view attachment header has a title, a list of publishers and a list of subscribers, each such list with the scope of the entire view attachment. All one view attachment data consist of view attachment groups 203 where each such view attachment group comprises a title, data items, a list of publishers and a list of subscribers, each such list with the scope of its view attachment group. Each data item in the view attachment data group comprises a name 205 and value 206 which are set and formatted as view service request/response data item name and value.

The initial state of data in a view attachment is held in its template from which view attachment generations are derived by setting values for data item names in the view attachment template 204 or by updating the latest generation of the view attachment. Any information provided in the view attachment template is immutable and published as such. Each view attachment publication creates a view attachment generation 207 to record the current time 208 and state of view attachment information to its history whereupon such information becomes available to all view attachment parties which can elect to be notified about this event. When a view attachment is created as the result of a view service as seen in FIG. 9, such view service request is published by the view service client, which is deemed the creator of such view attachment, as one view attachment group 111 while such view service response is published by the view service server as another view attachment group 112. Each view service instance creates a new generation of the view attachment that has been created by such view service. Any view attachment created not as the result of a view service can be stored by such view attachment creator into a public repository of view attachments to facilitate their distribution and broaden the base for data analysis.

The data analysis of view attachments is performed by evaluating analytic rules each comprising conditional statements that apply to view attachment data items to derive analytical conclusions; such conditional statements are interdependent where the result of one conditional statement can be included into another conditional statement. The conditional statements as seen in FIG. 21 are recorded as conditional and arithmetic expressions 211, or combinations thereof, with view attachment data items referenced by their name ids 212 and applied to their values 213. The outcome generated by the analytic rules can update view attachments or trigger view services. The analytic rules are stored with their view attachments into either a public repository of view services or public repository of view attachments that are not created by view services. The creators of analytic rules can add new analytic rules to the view attachments stored in a public repository of view attachments or to the public view services stored in a public repository of view services.

Although this invention has been described in connection with a preferred embodiment, it should be understood that various modifications, additions and alterations may be made to the invention by one skilled in the art without departing from the spirit and scope of the invention as defined in the appended claims.

The embodiments of the invention in which an exclusive property or privilege is claimed are defined as follows:

1. A social networking system comprising users which are represented by a plurality of their informational views connected by view relationships where each such view comprises a view identity, which is attached to each view, view permissions, view connection preferences and view content, wherein said view connection preferences consist of descriptive view connection preferences that describe its view to connecting views and requisite view connection preferences that stipulate what information is required in connecting views each comprising a plurality of data items each consisting of a data item name and data item value to be formatted according to a valid format, including any supplementary data to be formatted according to a corresponding universally accepted format, and to be supplemented by crowd source data that expands view matching capacity to improve view connectivity wherein said data item name or data item value are supplemented by crowd source data that has the same formatting as the data item name or data item value that the crowd source data is set to supplement and that is arranged according to its relevance to the data item name and data item value that the crowd source data is set to supplement, wherein said crowd source data is stored so that new crowd source data is added i) to the same crowd source as the one storing the data item name or data item value, or ii) to said same crowd source where new crowd source data exist while the data item name or data item value does not exist, or, when no crowd source is found, iii) to a new crowd source which stores both the new crowd source data and the data item name or data item value that new crowd source data is set to supplement.

2. A social networking system according to claim 1 wherein i) said data item name is supplemented by crowd source data names when such crowd source data names exist in the same crowd source as the data item name and such crowd source data names are included as valid alternatives for the data item name in any evaluation or process where such information is sought, and ii) said data item value is supplemented by crowd source data values when such crowd source data values exist in the same crowd source as the data item value and such crowd source data values are included as valid alternatives for the data item value in any evaluation or process where such information is sought.

3. A social networking system according to claim 1 or 2 wherein said views connect according to their relationships with each other whereby a view relationship exists i) when one view follows another view to create a following view relationship for the former view, or ii) when one view is followed by another view to create a follower view relationship for the former view, or iii) when the view connection preferences of one view are mutually compatible with the view connection preferences of another view to create a mutual shared, or intelligent, view relationship for either view, wherein the requisite view connection preferences of one view are compatible with the descriptive view connection preferences of another view and vice versa, or iv) when one view joins a group view to create a mutual group view relationship with each group member view of such group view, or v) when two views are otherwise connected to create an other view relationship for either view.

4. A social networking system according to claim 3 wherein said group member view of a group view may be represented outside of its group view by adopting such group view identity, group view connection preferences and group view permissions which are deemed to be assumed by said group member view to initialize their own corresponding settings.

5. A social networking system according to claim 3 wherein said views serve each other by a view service whereby one view, being a view service client, communicates a view service request to another view, being a view service server, which may communicate any information contained in such view service request as a web service request to a web service and formats any information received in the response from such web service as a view service response which is provided to the view service client regardless of whether a web service is used.

6. A social networking system according to claim 3 wherein said views store data into view attachments each consisting of a i) header that includes a title, a list of view attachment publishers and a list of view attachment subscribers each with an access scope of such view attachment and that are set according to their view relationships with such view attachment creator, and ii) view attachment groups each consisting of a title, a list of view attachment group publishers and a list of view attachment group subscribers each with the access scope of their assigned view attachment groups and that are set according to their view relationships with such view attachment creator, and view attachment group data items each comprising a name and value where such view attachment group data item names are referenced by their ids to be used in data analytic rules comprising conditional and arithmetic expressions, or combinations thereof, to trigger conditional actions, wherein such view attachment subscribers and view attachment group subscribers access such view attachment data according to their assigned access scope and as set by such view attachment publishers and view attachment group publishers respectively.

7. A social networking system according to claim 6 wherein said view attachment has its initial state of immutable data stored in its template from which view attachment generations are derived either by setting values for data item names from the view attachment template or by updating the latest generation of the view attachment which is created by each view attachment publication to record a current time and state of view attachment information to its history whereupon such information becomes available to the view attachment subscribers.

\* \* \* \* \*